United States Patent [19]
Boyce et al.

[11] Patent Number: 6,023,553
[45] Date of Patent: Feb. 8, 2000

[54] METHOD AND APPARATUS FOR ACHIEVING VIDEO DATA REDUCTION THROUGH THE USE OF RE-ENCODING

[75] Inventors: Jill MacDonald Boyce, Manalapan; Frank Anton Lane, Medford Lakes, both of N.J.

[73] Assignee: Hitachi America, Ltd.

[21] Appl. No.: 08/910,061

[22] Filed: Aug. 6, 1997

Related U.S. Application Data

[60] Division of application No. 08/298,524, Aug. 30, 1994, Pat. No. 5,717,816, which is a continuation-in-part of application No. 08/228,949, Apr. 18, 1994, Pat. No. 5,805,762, which is a continuation of application No. 08/004,158, Jan. 13, 1993, abandoned.

[51] Int. Cl.[7] .............................. H04N 5/917; H04N 7/26
[52] U.S. Cl. ........................................... 386/109; 386/112
[58] Field of Search ..................................... 386/109, 111, 386/112, 33, 27, 124, 46, 68, 34, 40; 348/384, 390; 360/32

[56] References Cited

U.S. PATENT DOCUMENTS

| | | |
|---|---|---|
| 3,934,268 | 1/1976 | Uemura . |
| 4,031,548 | 6/1977 | Kato et al. . |
| 4,139,867 | 2/1979 | Foerster . |
| 4,193,098 | 3/1980 | Bixby et al. . |
| 4,263,623 | 4/1981 | Woo et al. . |
| 4,290,087 | 9/1981 | Bixby et al. . |
| 4,339,775 | 7/1982 | Lemke et al. . |
| 4,355,324 | 10/1982 | Reitmeier . |
| 4,392,162 | 7/1983 | Yamamoto . |
| 4,504,869 | 3/1985 | Warren . |
| 4,510,538 | 4/1985 | Sato et al. . |
| 4,541,020 | 9/1985 | Kimura . |
| 4,558,376 | 12/1985 | Heitmann . |
| 4,584,613 | 4/1986 | Amari et al. . |
| 4,636,874 | 1/1987 | Hoogendoorn et al. . |

(List continued on next page.)

FOREIGN PATENT DOCUMENTS

| | | |
|---|---|---|
| 0397264 | 5/1990 | European Pat. Off. . |
| 0469842 | 2/1992 | European Pat. Off. . |
| 0505985 | 9/1992 | European Pat. Off. . |
| 0509594 | 10/1992 | European Pat. Off. . |
| 0562845 | 9/1993 | European Pat. Off. . |
| 4-14973 | 1/1992 | Japan . |
| 5-37114 | 6/1993 | Japan . |
| WO 91/02430 | 2/1991 | WIPO . |

OTHER PUBLICATIONS

Lew B. Stelmach and Wa James Tam, "Viewing–based Image Coding For Advanced Television Systems", International Workshop on HDTV (1993).

Drafts of Recommendation H.262,ISO/IEC 13818–1 titled "Information Technology—Generic Coding of Moving Pictures and Associated Audio", (Nov. 1993 ISO–MPEG Committee draft).

Drafts of Recommendation H.262,ISO/IEC 13818–2 titled "Information Technology—Generic Coding of Moving Pictures and Associated Audio", (Nov. 1993 ISO–MPEG Committee draft).

(List continued on next page.)

*Primary Examiner*—Robert Chevalier
*Attorney, Agent, or Firm*—Straub & Pokotylo; Michael P. Straub

[57] ABSTRACT

Method and apparatus for extracting intra-coded video frames from a video data stream including inter-coded video frames and intra-coded video frames to produce reduced resolution intra-coded video frames suitable for recording in trick play tape segments of a tape for later play back and display during video tape recorder trick play operation. A plurality of methods and apparatus for buffering and selecting received intra-coded video frames for recording in trick play tape segments to support a plurality of trick play modes of operation are disclosed. In addition, a plurality of different data reduction methods and apparatus are disclosed for generating reduced resolution intra-coded frames from the received full resolution intra-coded video frames.

11 Claims, 4 Drawing Sheets

U.S. PATENT DOCUMENTS

| | | |
|---|---|---|
| 4,636,879 | 1/1987 | Narita et al. . |
| 4,668,998 | 5/1987 | Aoki . |
| 4,783,707 | 11/1988 | Nemoto et al. . |
| 4,807,053 | 2/1989 | Heijnemans . |
| 4,825,301 | 4/1989 | Pape et al. . |
| 4,887,169 | 12/1989 | Bannai et al. . |
| 4,899,233 | 2/1990 | Yoshida . |
| 4,910,605 | 3/1990 | Sasaki et al. . |
| 4,931,879 | 6/1990 | Koga et al. . |
| 4,985,781 | 1/1991 | Hirasawa . |
| 5,023,710 | 6/1991 | Kondo et al. . |
| 5,027,235 | 6/1991 | Furuyama . |
| 5,047,869 | 9/1991 | Aoki et al. . |
| 5,050,014 | 9/1991 | Maeda et al. . |
| 5,065,259 | 11/1991 | Kubota et al. . |
| 5,097,363 | 3/1992 | Takei et al. . |
| 5,119,208 | 6/1992 | Fujimoto . |
| 5,126,852 | 6/1992 | Nishino et al. . |
| 5,132,807 | 7/1992 | Takimoto et al. . |
| 5,134,464 | 7/1992 | Basile et al. . |
| 5,134,476 | 7/1992 | Aravind et al. . |
| 5,136,391 | 8/1992 | Minami . |
| 5,136,394 | 8/1992 | Haikawa et al. . |
| 5,140,417 | 8/1992 | Tanaka et al. . |
| 5,140,437 | 8/1992 | Yonemitsu et al. . |
| 5,144,425 | 9/1992 | Joseph . |
| 5,146,337 | 9/1992 | Grubbs . |
| 5,148,272 | 9/1992 | Acampora et al. . |
| 5,168,356 | 12/1992 | Acampora et al. . |
| 5,208,673 | 5/1993 | Boyce . |
| 5,212,549 | 5/1993 | Ng et al. . |
| 5,218,449 | 6/1993 | Ko et al. . |
| 5,225,946 | 7/1993 | Uchiumi . |
| 5,282,049 | 1/1994 | Hatakenaka et al. . |
| 5,291,343 | 3/1994 | Goto . |
| 5,335,117 | 8/1994 | Park et al. . |
| 5,355,229 | 10/1994 | Arano et al. . |
| 5,359,471 | 10/1994 | Hasegawa . |
| 5,386,241 | 1/1995 | Park . |
| 5,390,052 | 2/1995 | Kato et al. . |
| 5,419,623 | 5/1995 | Park . |
| 5,475,498 | 12/1995 | Radice ........................................ 386/46 |
| 5,477,397 | 12/1995 | Naimpally et al. . |
| 5,493,456 | 2/1996 | Augenbraun et al. . |
| 5,583,650 | 12/1996 | Lane et al. . |
| 5,587,806 | 12/1996 | Yamada et al. . |

OTHER PUBLICATIONS

Ho, Yo–Sung, et al. MPEG–Based Video Coding for Digital Simulcasting, International Workshop on HDTV —92, Nov. 18–20, 1992, Proceedings vol. 1, pp. 141–148.

Robert Rast, Joseph Glaab, General Instrument Corporation, "Interoperability Considerations for Digi Cipher HDTV", Oct. 1, 1992.

Sun, H., et al. "Error Concealment in Digital Simulcast AD–HDTV Decoder, "IEEE Transactions on Consumer Electronics, vol. 38, No.3, Aug. 1992, pp. 108–118.

J. Lee, J. Seo, Y. Park, D. Youn, T. Oh, IEEE Transactions on Consumer Electronics, "A Study on New DCT—Based Bit Rate Reduction Algorithm and Variable Speed Playback for a Home–Use Digital VCR", vol. 38, No.3, Aug. 1992, pp. 236–241.

Advanced Television Research Consortium, "Advanced Digital Television, Prototype Hardware Description", Feb. 12, 1992.

David Sarnoff Research Center, Philips Laboratories, "Advanced Digital Television, System Description", Jan. 20, 1992.

I.S.O. MPEG (Moving Pictures Expert Group), "Coding of Moving Pictures and Associated Audio for Digital Storage Media at up to about 1.5 Mbit/s, Part 2 Video", 2–11172 rev 1, Nov. 23, 1991.

Zenith, AT&T, "Technical Details, Digital Spectrum Compatible", Sep. 23, 1991.

C. Yamamitsu, A. Ide, M. Nishino, T. Juri, H. Ohtake, IEEE Transactions on Consumer Electronics, "A Study on Trick Plays for Digital VCR", vol. 37, No. 3, Aug. 1991, pp. 261–266.

S. Inoue, H. Kaneko, H. Takao, T. Fujii, M. Ishibashi, IEEE Transactions on Consumer Electronics, "New Method for Variable Speed Playback for High Definition VCRs", vol. 37, No. 3, Aug. 1991, pp. 244–251.

General Instrument Corporation Videocipher Division, "Digicipher HDTV System Description", Document No. 62004, Aug. 22, 1991.

Richard Brush, "Design considerations for the D–2 NTSC composite DNTR", pp. 182–193, SMPTE Journal, Mar. 1988.

S. Lipshitz, J. Vanderkooy, "Digital Dither", Journal Audio Eng Soc.;vol.34, No.12, p. 1030, (Dec. 1986).

N.S.Jayant and P.Noll, Digital Coding of Waveforms, Prentice–Hall, 1984, pp. 164–170.

N. S. Jayant and L. R. Rabiner, "The Application of Dither to the Quantization of Speech Signals," Bell System Technical Journal, pp. 1293–1304, Jul.–Aug. 1972.

M.S.Hong, T.E.Kim, Y.K.Kim, G.M.Park, S.K.Kim, IEEE 1992 International Conference on Consumer Electronics Digest of Technical Papers, "Adaptive Bit Allocation Coder for DVCR Trick Play", Jun. 2, 1992, pp. 110–111.

P.Kauf, S.Rauthenberg, "A DCT Coding Scheme for digital HDTV Recording", Signal Processing of HDTV, III Proceedings of the 4th Int. Workshop on HDTV, Apr. 9, 1991, pp. 33–41.

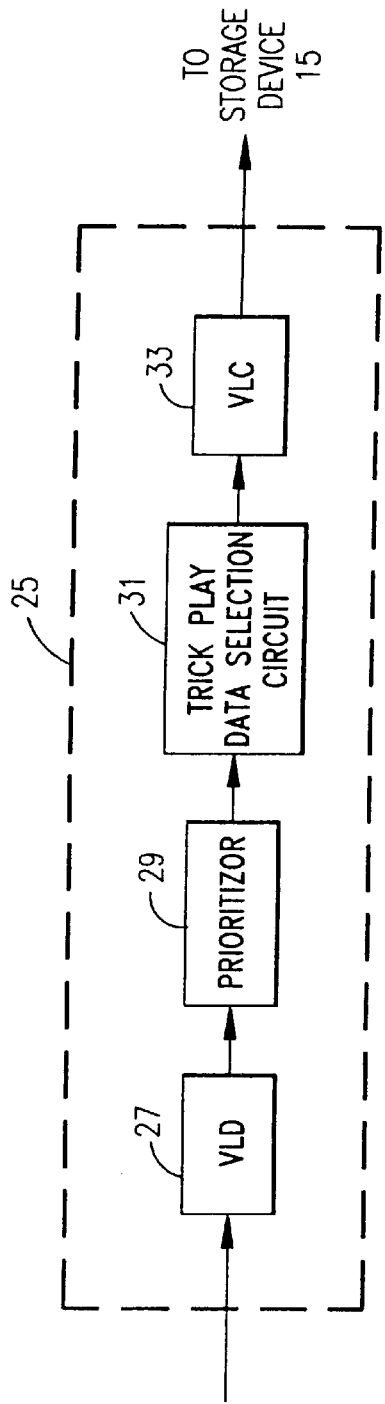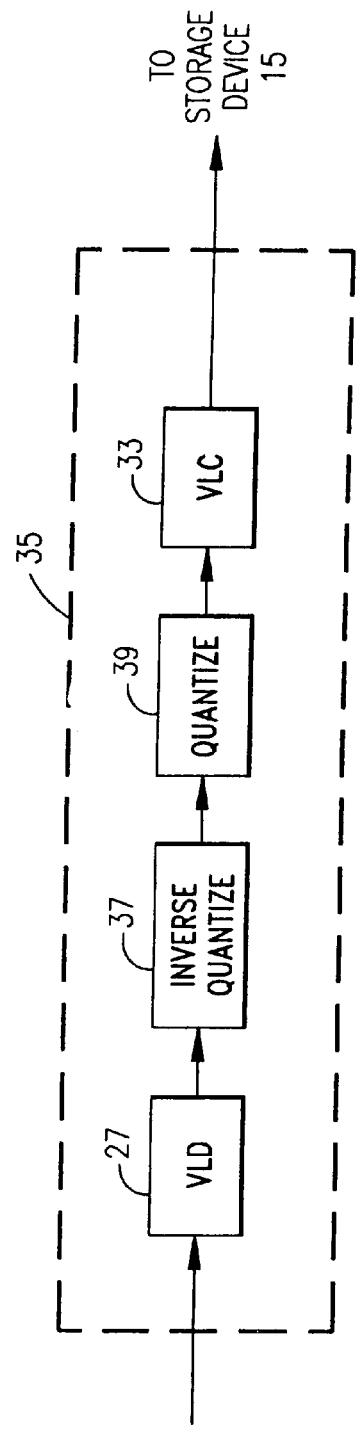

METHOD AND APPARATUS FOR ACHIEVING VIDEO DATA REDUCTION THROUGH THE USE OF RE-ENCODING

RELATED APPLICATION

This application is a divisional of application Ser. No. 08/298,524 which issued as U.S. Pat. No. 5,717,816 and U.S.patent application Ser. No. 08/298,524, which issued as U.S. Pat. No. 5,717,816 and filed Aug. 30, 1994 now U.S. Pat. No. 5,717,816 which is a continuation-in-part of U.S. patent application Ser. No. 08/228,949, filed Apr. 18, 1994 which issued as U.S. Pat. No. 5,805,762 and which is a continuation of U.S. patent application Ser. No. 08/004,158, filed Jan. 13, 1993, now abandoned. Each of the above referenced applications is hereby expressly incorporated by reference.

FIELD OF THE INVENTION

The present invention is directed to data extraction techniques and, more particularly, to a method and apparatus for extracting intra-coded video frames from a video bitstream and processing the selected intra-coded video frames to generate intra-coded video frames suitable for use during video tape recorder ("VTR") trick play operation.

BACKGROUND OF THE INVENTION

Generally, VTRs are designed to receive and store data signals representing video (and audio information) by recording the data on a magnetic tape in a series of tracks. In addition, most VTRs are designed to support both normal and trick playback operation, i.e., fast forward and reverse operation.

The use of digital video signals, e.g., digital high definition television ("HDTV") signals, which are normally transmitted in a compressed format, present problems with regard to the implementation of trick playback operation in VTRs.

Various systems have been proposed that would locate data selected to be used during trick play operation in specific locations within the tracks on a tape so that at least a minimum amount of data required to produce recognizable images during trick playback operation can be read in a reliable manner from the tape. Tape locations which are dedicated to storing data intended to be read from the tape at a particular speed and direction of trick play operation may generally be referred to as fast scan tracks for the particular speed and direction of trick play VTR operation. For example, the phrase "3× fast scan track" may be used to refer to a series of tape location containing data for 3× fast forward trick play operation while the phrase "−2× fast scan track" may be used to refer to a series of tape locations containing data for 2× reverse speed trick play operation.

Because of limitations on the amount of data that can be read back from the tape during trick play operation using such systems, video images used during trick play operation must usually be represented using considerably less data than is used to represent images, e.g., frames, that are displayed during VTR normal playback operation.

Accordingly, because of the data constraints imposed during trick playback operation, it is important that the data used to represent video frames during trick playback operation be carefully selected.

Thus, the proposed digital VTR systems offer a number of possible solutions to the problem of how to record digital data on a tape so that it can be read from the tape in a reliable manner during trick play. However, there is still a need for an improved method and apparatus for selecting data from a compressed video data stream to represent a video frame that can be recorded on the video tape and read back and displayed during trick playback operation.

Because the method of selecting data from a video data stream for use during trick playback operation will depend in large part on the content of the compressed video data stream from which the data must be selected, it is important to have an understanding of the various elements of a compressed digital video data stream, how those elements, e.g., video frames, slices, macroblocks, motion vectors, DCT coefficients, etc., relate to each other, and how the compressed video data stream is originally created.

The International Standards Organization has set a standard for video data compression that is suitable for generating a compressed digital data stream such as a digital HDTV data stream. This standard is referred to as the ISO MPEG-2 (International Standards Organization—Moving Picture Experts Group) ("MPEG-2") standard.

While various versions of this data compression standard exist, and new versions are expected in the near future, all versions of the MPEG-2 standard are expected to use the same basic data compression techniques. For the purposes of this application, unless indicated otherwise, terms will be used in a manner that is consistent with the MPEG-2 standard that is described in the International Standards Organization—Moving Picture Experts Group, Draft of Recommendation H.262, ISO/IEC 13818-2 titled "Information Technology—Generic Coding Of Moving Pictures and Associated Audio" (hereinafter "the November 1993 ISO-MPEG Committee draft") hereby expressly incorporated by reference. Any references to MPEG-2 data streams in this application are to be understood to refer to data streams that comply with MPEG-2 standards.

In accordance with the MPEG standard, analog video signals are digitized and compressed in accordance with an MPEG data compression algorithm to produce the digital video data stream.

In accordance with the MPEG data compression algorithm, after the analog video signals are digitized, the digital data is organized into macroblocks and the macroblocks are then encoded.

In accordance with the MPEG standard, within a given frame, each macroblock may be coded using one of several different encoding techniques, e.g., motion compensation techniques and intra-frame coding techniques. Intra-frame coding refers to a macroblock coding technique in which only spatial information is used. Intra-coded macroblocks are produced using this coding technique.

Inter-frame coding, unlike intra-frame coding, uses motion compensation techniques which utilize data from other frames when performing the encoding operation. Accordingly, inter-coded macroblocks which are produced using inter-frame coding techniques are dependent on preceding and/or subsequent frames and include motion vectors which are the result of the motion compensation operation. The MPEG-2 standard allows for the optional use of both intra-coded and inter-coded macroblocks in a video frame.

In accordance with the MPEG compression algorithm, after motion vectors have been calculated in video frames that are to be inter-coded, each of the intra-coded and intra-coded macroblocks which comprise the video data are transform encoded by performing a discrete cosine transform ("DCT") operation. As a result of the DCT operation, blocks of DCT coefficients are produced. These coefficients include both DC and higher frequency (AC) coefficients.

After performing the DCT operation, the resulting data is variable length encoded by performing adaptive quantization on the data with the quantization factor mquant used being indicated by header information included in the encoded video data stream that is produced as a result of the encoding operation.

The MPEG standard provides for the arrangement of macroblocks into slices with each frame being made up of one or more slices. A slice is an integer number of consecutive macroblocks from a raster of macroblocks. Video frames which include only intra-coded macroblocks are referred to as intra-coded ("I-") frames. Video frames which include predictively coded macroblocks are refered to as P-frames. While frames which include bi-directionally coded macroblocks are referred to as B-frames. P- and B-frames are, because of the type of encoding used, inter-coded frames.

In accordance with MPEG proposal, frames may be arranged into ordered groups refered to as groups-of-pictures ("GOPs"). GOPs may be of any size where the GOP size is the distance between I-frames in the encoded bitstream. The use of groups-of-pictures, which is optional in MPEG-2, is intended to assist random access into the sequence.

To summarize, an MPEG data stream generated using the encoding technique described above, includes a series of variable length encoded video frames, each frame being represented by a series of intra-coded and/or inter-coded macroblocks, where each macroblock includes DCT coefficients and possibly motion vectors. Furthermore, the data representing the video frames may be arranged as groups-of-pictures while the macroblocks representing each video frame may be arranged into slices which represent a portion of a frame.

Because MPEG-2 allows for a wide latitude in the encoding techniques used, an MPEG-2 data stream may include I-frames on a routine basis or may not include any routine I-frames.

When I-frames are used at regular intervals, e.g., every ninth frame, the picture will be refreshed on a regular basis.

In the case where intra-coded frames are not used at regular intervals it is expected that progressive refresh will be used instead of I-frames. Both modes of refreshing the picture are allowed within MPEG-2.

In addition to permitting I-frames or progressive refresh to be used, MPEG-2 also allows for various other encoding options that complicate the selection of data for use during trick play. For example, MPEG-2 permits DC coefficients to be represented with 8, 9 or 10 bits of precision, it also permits pictures to be represented in a field picture format or a frame picture format. In addition, MPEG-2 provides two different patterns to be used for converting a 2-dimensional DCT block into a 1-dimensional sequence, the default being a zig-zag scan pattern with the optional alternative being an alternate_scan pattern. It also provides two different tables of quantization scale factor (mquant) values to be used to encode the video data, i.e., a default q_scale_type table and an alternate q_scale_type table. MPEG-2 also allows for a change of the quantization matrix from a default quantization matrix.

For a more detailed discussion of the above possible variations between MPEG-2 encoded bitstreams, see the November 1993 ISO-MPEG Committee draft referred to above.

Because intra-coded frames can be decoded without data from other frames, they are particularly well suited for use during trick play. However, because of the data constraints imposed by the recording media for data selected for trick play operation, it often difficult or impossible to record all of the I-frames for later playback during trick play.

Furthermore, because I-frames may not occur in a predictable pattern, e.g., because the GOP size is permitted to vary in MPEG, it becomes difficult to select which I-frames should be selected for use during different modes of trick play operation.

Selection of I-frames for trick play operation is further complicated by the fact that the variable length encoded I-frames, of the type expected to be included in a HDTV bitstream may vary in size making it difficult to efficiently record the I-frame in tape segments of limited sizes allocated for trick play data.

Accordingly, there is a need for a method and apparatus that can process a compressed video bitstream, such as an MPEG-2 video bitstream, to produce from the data in the bitstream, a sufficient number of intra-coded video frames to support trick play operation.

Furthermore, it is desirable that the fully intra-coded trick play video frames produced by such a method and apparatus require less data to store than comparable fully intra-coded frames intended to be displayed during VTR normal playback operation.

SUMMARY OF THE PRESENT INVENTION

The present invention is directed to data extraction techniques and, more particularly, to methods and apparatus for extracting intra-coded video frames from a digital video bitstream and for processing the selected intra-coded video frames to generate intra-coded video frames suitable for use during video tape recorder ("VTR") trick play operation.

In accordance with one exemplary embodiment of the present invention, I-frames included in a received video data stream are identified and stored in a buffer in the order they are received. As received I-frames are written to the buffer the previously stored I-frame is overwritten insuring that the most recently received I-frame is stored in the buffer at any give time.

When an I-frame is required to support a particular mode of trick play operation, e.g., 3×, 9×, 27× fast forward or reverse speed trick play operation, the buffer in which the most recently received I-frame is stored is accessed insuring that the most recently received I-frame will be output whenever an I-frame is required to support a mode of trick play operation. In this manner, when more I-frames are received than are required for a particular mode of operation the I-frame that is used will always be the most recently received I-frame.

In order to reduce the amount of data required to represent the I-frames selected for use as trick play frames, the apparatus of the present invention incorporates data reduction circuitry.

In accordance with one embodiment of the present invention, data reduction is achieved by performing variable length decoding, data prioritization, data selection and variable length encoding on received I-frames to generate reduced resolution I-frames suitable for recording in trick play tape segments of a tape.

In another embodiment data reduction is achieved by variable length decoding the video data representing the received I-frames, inverse quantizing the video data, re-quantizing the video data using a higher quantization scale factor than was originally used to quantize the data, and then variable length encoding the re-quantized data to generate low resolution I-frames suitable for recording in trick play track segments on the tape.

In yet another embodiment data reduction is achieved by removing the AC DCT coefficients from the data representing each I-frame. In still another embodiment, data reduction is achieved by representing the center of the I-frames at a higher resolution than the outer edges of the I-frames.

Numerous other embodiments and features of the present invention are described in the detailed description set forth below.

BRIEF DESCRIPTION OF THE DRAWINGS

FIGS. 2A–2C are schematic block diagrams of exemplary data reduction circuits which may be used as any one of the data reduction circuits illustrated in FIGS. 1A or 1B.

FIG. 3 is a table illustrating the frames selected for 9× trick play speed by a video frame selection circuit in accordance with one embodiment of the present invention.

DERAILED DESCRIPTION

Figure 1A:
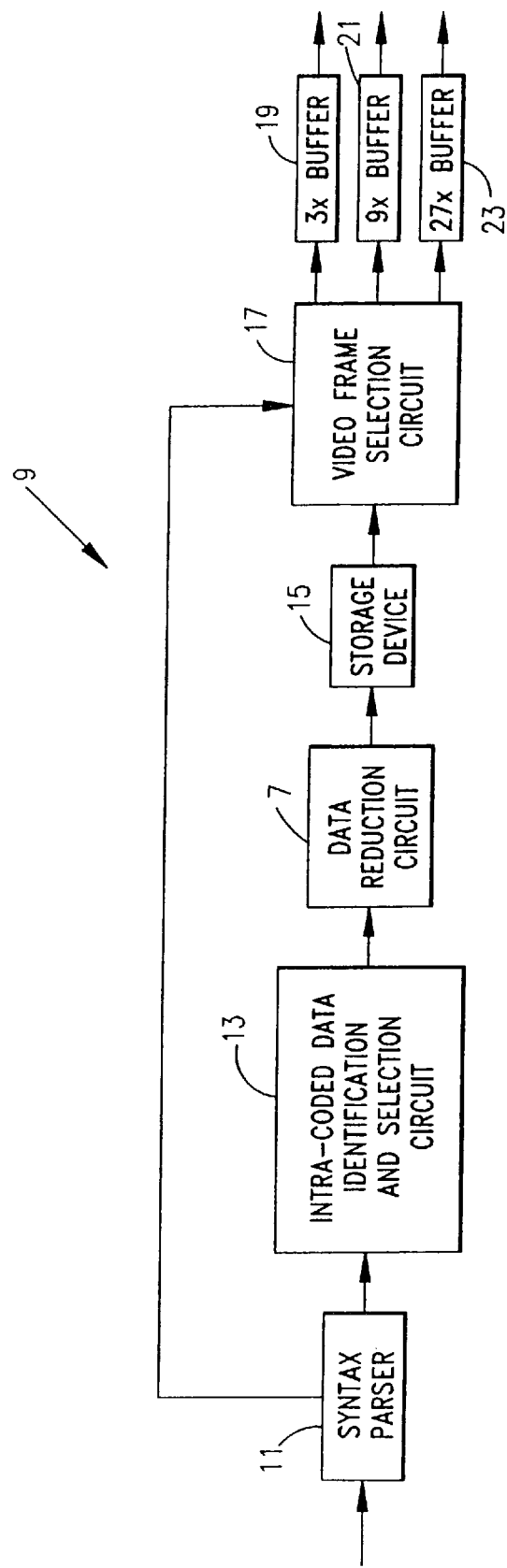
FIG. 1A is a schematic block diagram of a trick play frame generation circuit in accordance with one embodiment of the present invention.

The present invention is directed to data extraction techniques and, more particularly, to a method and apparatus for extracting intra-coded video frames from a digital video bitstream and for processing the selected intra-coded video frames to generate intra-coded video frames suitable for use during video tape recorder ("VTR") trick play operation. In accordance with the present invention, the generated intra-coded video frames can be recorded on a tape and later read back during VTR trick play operation to provide sufficient data to produce recognizable images or portions of images during trick play operation.

Selection of intra-coded video frames from a received bitstream of video data is easiest when a fixed size of GOPs is used and the size of the GOPs is known. In such a case, I-frames will arrive in the bitstream in a predictable manner. By selecting a trick play speed that corresponds to the interval between I-frames, selection of the I-frames for trick play operation becomes straight forward with each received I-frame being selected for recording and later playback during trick play operation. For example, if the GOP size were 7 and the trick play speed to be supported was 7×, each received I-frame can be selected and used for trick play operation. Similarly, where the trick play speed is an integer multiple of a GOP size, in a system which has a single GOP size, it is easy to select received I-frames for trick play use. For example, if the GOP size is fixed at 7 and the trick play speed to be supported is 14×, one can select every other received I-frame for recording in trick play tape segments on a tape corresponding to a 14× fast scan track. In accordance with one embodiment of the present invention, where the GOP size is N and the speed up rate is M, every M/N received I-frames are selected for use during Mx trick play operation, where M and N are integers such that M/N is also an integer.

However, MPEG-2 does not require that GOP's be of a fixed size. Accordingly, for a VTR to support trick play using an MPEG bit stream or other video bitstream that does not include GOPs of a fixed size, the VTR should be capable of selecting I-frames for trick play use despite the unpredictable timing of I-frames in the video bitstream received by the VTR.

As discussed above, because of the data constraints associated with trick play VTR operation, it may not be possible to record an entire full resolution I-frame in the trick play tape segments of a tape. In such a case, it has been found that recording a low resolution version of entire I-frames in the fast scan track, rather than recording only spatial sections of frames, will generally result in better image quality in sequences with significant motion. In accordance with the present invention, it is not necessary that every single I-frame included in the received video data stream be used during trick playback for each speed of trick playback operation being supported. In fact, it is possible, and often desirable, to trade off the resolution that is retained in the I-frames that are used during trick play and the frequency with which new I-frames are recorded for later playback during trick play VTR operation.

As used in this application, hold time is used to refer to the amount of time each I-frame recorded on a tape will be displayed, e.g., repeated, during VTR trick playback operation. Hold time is measured as a multiple of a single frames normal display time.

As discussed above, there is a limited amount of space in the trick play tape segments from which a VTR can reliable read back data during trick play operation. The more often I-frames are updated in the trick play tape segments, the fewer bits are available to code each frame. Thus, as the number of I-frames recorded in the trick play tape segments is increased, the spatial resolution of the I-frames must be decreased due to the data constraints imposed by the limited size of the available trick play tape segments.

In the case where the GOP size is known and is equal to the trick play speedup, if the GOP size is large enough such that a reasonable amount of space is available in the trick play tape segments for the particular speed of trick play operation, a low resolution version of each I-frame that arrives can be recorded in the trick play tape segments. For example, if the GOP size is 9 and the trick play speedup is 9, every 9th input frame will be an I-frame and during trick playback operation only ⅑th as many frames will be available to be displayed, because of the 9× speed up, as were available to be displayed during normal VTR playback operation. As described above, each I-frame selected to be read back and displayed during trick play operation can be a low resolution version of each normal play I-frame received by the VTR. In this example, where one trick play frame is displayed for a period corresponding to one normal play frame time, the hold time is one frame time, e.g., ⅟30 of a second where each frame is displayed for ⅟30 of a second during normal VTR playback operation.

In the case where I-frames arrive very often in the received digital video data stream, e.g., every 3 frames, with a speedup of 3, e.g., 3× fast forward trick play operation, because of the limited storage space available in the trick play tape segments for 3× trick play, it might be desirable not to use every I-frame that arrives, but to choose a subset of the I-frames and to repeat them during trick play, i.e., display them for more than a single frame time, i.e. a hold time greater than 1. Since the amount of space available in trick play tape segments for higher speeds of VTR operation is generally lower than for low speeds of trick play operation because of physical limitations placed on reading data accurately from the tape at high speeds of VTR operation, in some cases, as during high speed playback operation, e.g., 9× fast forward, there may not be enough space to space in the trick play tape segments to record even the DC coefficients of each received I-frame.

Generally, to maintain compatibility with display devices used during normal VTR playback operation, the hold time should not be less than one frame time.

For example, if a GOP size is 12 and the speedup is 3, if only I-frames are used, the hold time will be at least 4 frame times. If, in accordance with the present invention a trick play data extraction circuit 9 such as the one illustrated in FIG. 1, chooses to use only every other I-frame, then for this example, the hold time would be 8 frame times. If the hold time is 1 frame time, and the speedup is n, 1 trick play frame is record for every n*m input frames.

To offer a selection of speed playback operations, a digital VTR may support multiple speedup factors, e.g., 3×, 9×, 27×, etc. At most, the GOP size can match only one of the supported speedup factors. Accordingly, to offer a degree of flexibility the data extraction circuit 9 of the present invention is designed to choose which of the received I-frames that arrive in the digital video data stream are going to be used during each trick play speedup mode of VTR operation as will be discussed below in further detail.

Referring now to the drawings, and initially to FIG. 1, there is illustrated a trick play data extraction ("TPDE") circuit, generally indicated by the reference numeral 9, implemented in accordance with one embodiment of the present invention. As will be discussed below, the TPDE circuit 9 is suitable for receiving an encoded digital video bitstream, e.g., an MPEG-2 compliant bitstream, identifying I-frames in the bitstream, selecting from the identified I-frames, I-frames to be used for trick play operation. In addition, the TPDE circuit 9 can reduce the data required to represent the I-frames by one of a plurality of data reduction techniques to produce low resolution I-frames suitable for use during VTR trick play operation.

The TPDE circuit 9 comprises a syntax parser 11, and intra-coded video data identification and processing circuit 13, a data reduction circuit 7, a storage device 15, a video frame selection circuit 17, a 3× buffer circuit 19, 9× buffer circuit 21 and a 27× buffer circuit 23.

The syntax parser 11 receives the variable length encoded video bitstream which includes inter-coded frames, e.g., P- and B-frames and intra-coded frames, e.g., I-frames intended for normal play VTR operation. It also detects the frame to which received video data corresponds and generates a video frame indicator signal, that is supplied to the video frame selection circuit 13. The video frame indicator signal is asserted to indicate the receipt of video data corresponding to each new video frame received by the syntax parser 11. The syntax parser 11 parses the bitstream to identify data representing the different video frames and to generate as its output MPEG coding elements, e.g., macroblocks, motion vectors, DC and AC DCT coefficients, etc. included in the received bitstream. The syntax parser 11 may be thought of as performing a partial variable length decode operation in that individual MPEG coding elements are identified in the variable length encoded data stream. However, this parsing operation which is relatively simple to implement should not be confused with performing a full variable length decoding operation ("VLD" operation) as described below which is more difficult to implement.

The intra-coded video data identification and selection circuit 13 has an input coupled to the output of the syntax parser 11. In this manner, the intra-coded video data identification and selection circuit 13 receives the MPEG coding elements which represent a series of video frames. The identification and selection circuit 13 identifies the data corresponding to each received I-frame, which it then supplies to the data reduction circuit 7. The data reduction circuit 7 processes each I-frame to reduce the amount of data required to represent each I-frame, by e.g., producing a lower resolution representation of the I-frame.

The reduced resolution I-frames produced by the data reduction circuit 7 are stored in the storage device 15. As each new I-frame is stored in the storage device 15, the previously stored I-frame in the storage device 15 is overwritten so that at any given time the storage device 15 will contain the most recently processed I-frame.

The storage device 15, in accordance with the present invention, contains enough memory to store the largest processed I-frame that is expected to be used for recording in trick play segments on a tape. Because, in one embodiment of the present, I-frames are processed to reduce the amount of data used to represent the I-frame prior to storing in the storage device 15, in such an embodiment, the storage device 15 may be implemented using less memory than would be required to store a normal play I-frame. The data representing the processed I-frame may be stored either in a fixed length representation or a variable length representation. Since the worst case variable length coding of I-frame data is longer than fixed length coding of the same data, in accordance with one embodiment of the present invention, the I-frame data is stored in a fixed length representation and then variable length encoded before being output by the storage device 15. In such an embodiment, the data reduction circuit 13, processes the received variable length encoded I-frame data to convert it from its variable length representation to a fixed length representation prior to supplying it to the storage device 15.

As illustrated in FIG. 1, the video frame selection circuit 17 has a video frame data input coupled to the output of the storage device 15 for receiving therefrom the intra-coded video frame stored in the storage device 15 at any give point in time.

The video frame selection circuit 17, receives at an indicator signal input the video frame indicator signal output by the syntax parser 11. As a function of the video frame indicator signal, the video frame selection circuit 17 selects when the I-frame stored in the storage device 15 is to be used for each of a plurality of trick play speeds of operation, e.g., 3×, 9× and 27× fast forward or reverse speeds of operation, and outputs these frames, e.g., via corresponding outputs of the video frame selection circuit 17. For example, in one embodiment, every time the video frame selection circuit determines that three video frames have been received by the syntax parser 11, e.g., by counting that the video frame indicator signal has been asserted three times since the last time a video frame was supplied to the 3× speed output, the video frame selection circuit outputs the frame stored in the storage device 15. Similarly, the video frame selection circuit may output one frame to the 9× output every nine times the video frame indicator signal is asserted.

In an alternative embodiment, when the average time of a video frame is known, the video frame selection circuit supplies the frame stored in the storage device 15 to its outputs as a function of the amount of time that passes. For example, in one embodiment, when sufficient time passes to have displayed three video frames, the I-frame stored in the storage device 15 is supplied to the 3× speed output of the video frame selection circuit 17 for recording, e.g., in a 3× fast scan track segment. Using this timed approach, frames may be selected and output at non-integer multiples of the number of received video frames to support non-integer trick play speeds of VTR operation, e.g., 2.5 times fast forward speed, etc. Furthermore, in this embodiment, the syntax parser 11 need not generate a video frame indicator signal.

As illustrated in FIG. 1, the video frames output by the video frame selection circuit 17 are supplied to buffers with a different buffer 19, 21, 23 being used to store the I-frames selected for each speed of trick play operation supported by the VTR, prior to their recording in trick play tape segments on a tape.

Methods implemented by the video frame selection circuit 17, in accordance with various embodiments of the present invention, for selecting which of the received and processed I-frames are to be selected for a particular trick play speed of operation will now be described.

As discussed above, because GOP size may vary, I-frames may be located at various intervals, e.g., random intervals, within the received bitstream making the arrival of an I-frame difficult or impossible to predict. Furthermore, more than one I-frame may arrive during a trick play display interval, i.e., the interval during which a single trick play video frame is required to be displayed. For example, if I-frames arrive every 4 frames, but the trick play speedup is 8, only one frame can be displayed during trick play operation for each 8 received frames in the received, e.g., normal play, bitstream. When recording a fast scan track, e.g., an 8× fast scan track, the most recent I-frame that arrived is used in accordance with one embodiment of the present invention. If the speedup and GOP size are not simple multiples of one another, the hold time will not be uniform. For example, consider a sequence with a GOP size of 12 and a speedup of 9. The hold time is on average 1 and ⅓ frame times since, for ⅔ of the time the hold time is 1, and for ⅓ of the time the hold time is 2 as shown in the table of FIG. 4.

In FIG. 4, the time, in frame times, e.g, multiples of 1/30 of a second which is the time required to display one frame in an exemplary embodiment, is displayed in the first row. The receipt of I-frames in the received bitstream is shown in the second row, and the I-frames that will be selected by the video frame selection circuit 17, in accordance with one embodiment of the present invention, for 9× speed up trick play operation, are illustrated in the third row. The number in the third row indicates which of the received I-frames is selected for 9× trick play operation.

As illustrated in accordance with the present invention, the I-frame that most recently arrived is used for trick play. As discussed above, the arrival of I-frames is unpredictable. Thus, whenever an I-frame arrives, it is unknown if it will be the last I-frame that will arrive before it is time to select the next I-frame for recording in a trick play tape segment. Accordingly, each time an I-frame arrives it is identified and selected by the intra-coded data identification and selection circuit 13 and then stored in the storage device 15. If another I-frame arrives before time to output an I-frame for trick play, the I-frame stored in the storage device 15 is overwritten by the more recently identified and processed I-frame. In this way, whenever it is time to select an I-frame for trick play, the most recent I-frame is available in the storage device 15. As discussed above, in most cases full resolution I-frames may not be used for trick play alleviating the need to store full resolution I-frames in the storage device 15. In another embodiment, if the same spatial resolution is used for all speeds (i.e., DC only), one buffer can be used for all speeds.

When multiple speedups are supported in a VTR which uses a different set of trick play tape segments of a tape to store the data corresponding to each different speed up, the trick play tape segments corresponding to the different speed ups may be independent of each other. The data rates available, the spatial resolutions, and which I-frames to be used for each speed up (which affects the hold time as described above), will be different for each speedup rate. In such an embodiment, separate reduced rate bitstreams of low resolution I-frames are formed and separately stored, e.g., in the buffers 19, 21, 23, by the video frame selection circuit 17 for each of the different speedup rates.

In accordance with the present invention, multiple reduced rate bitstreams for different trick play speedups can be formed and stored in real time as I-frames are received by the syntax parser 11.

In another embodiment, where the spatial resolution of frames used for all speeds of VTR trick play operation is the same, e.g., in the case where only D.C. DCT coefficients are used to represent the low resolution trick play video frames, one buffer is used to support all the different speedup rates.

Figure 1B:
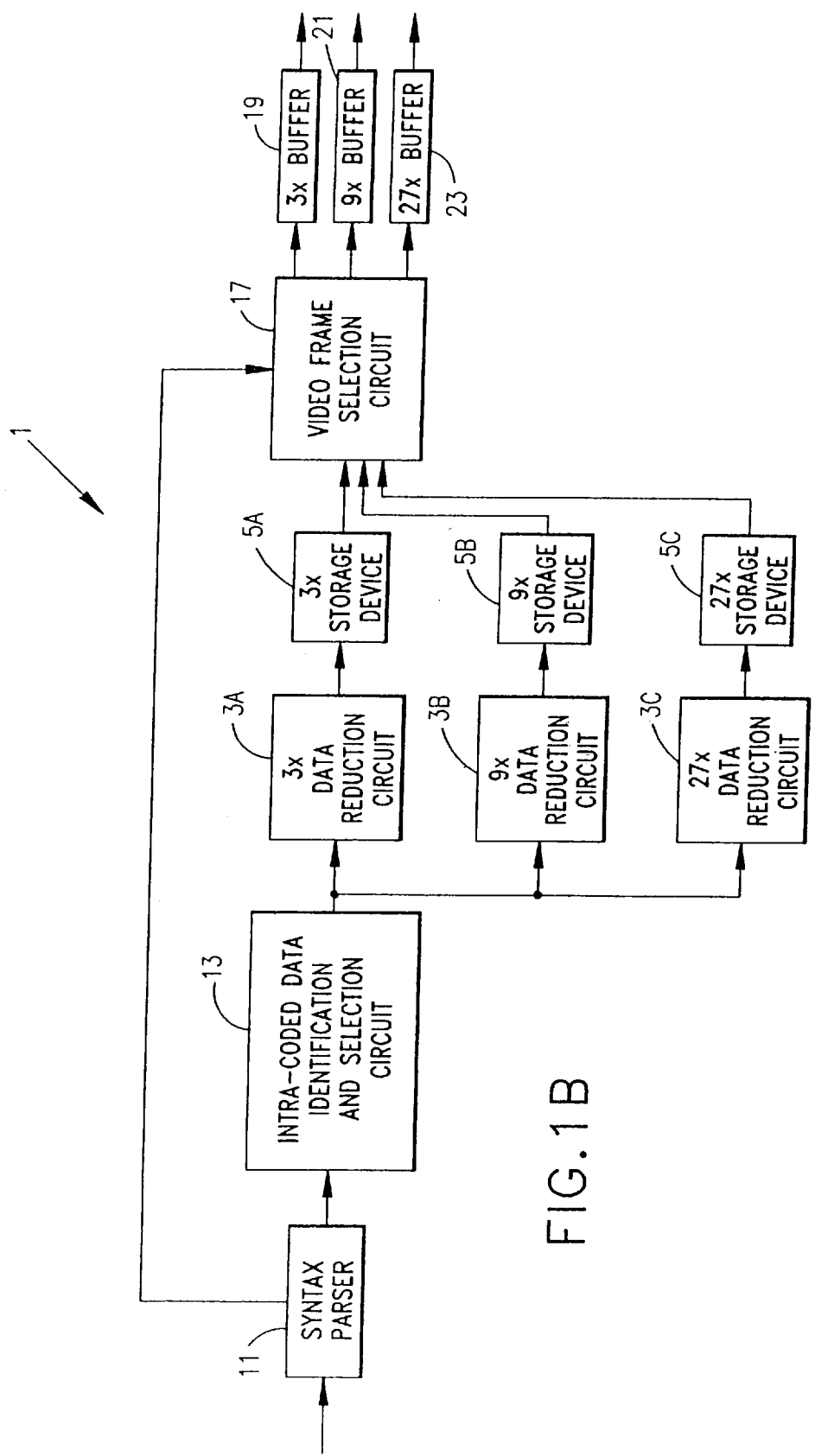
FIG. 1B is a schematic block diagram of a trick play frame generation circuit in accordance with another embodiment of the present invention.

Referring now briefly to FIG. 1B, a trick play data extraction circuit 1 is illustrated. Elements of FIG. 1B which are referenced using the same reference numerals as used in FIG. 1A, are the same as, or similar to, the like numbered elements of FIG. 1A.

When the hold time is increased with increasing speedup, a viewer can become confused because objects appear to move slower with longer hold times even though the speed up is faster.

To avoid such confusion, in accordance with one embodiment of the present invention, when multiple speedups are used in a single VTR, the hold time is not increased as the speedup increases. This results in an increased number of frames being displayed in a given time period than will be displayed in the same time period during a lower speed of trick play playback operation.

To the extent that data limitations require that the resolution of the I-frames be reduced to support reduced hold times for higher speedups, as illustrated in FIG. 1B, different data reduction circuits 3A, 3B, 3C and storage devices 5A, 5B, 5C may be used for each of the different speed ups. In such a case, the same I-frames are received as input to each of the data reduction circuits 3A, 3B, 3C with different amounts of data reduction being performed by each of the individual data reduction circuits. The data reduction circuits 3A, 3B and 3C are the same or similar to each other and the data reduction circuit 7. However, each is capable of providing the individual amount of data reduction required for each corresponding speed up factor. The storage devices 5A, 5B, 5C are also the same as or similar to each other. However, the size of the buffers may vary as required by the specific I-frame size requirements for the specific speedup factor being supported.

Thus, in accordance with the embodiment illustrated in. FIG. 1B, independent data streams for each speedup factor is supported thus allowing for different hold times and spatial resolutions for each trick play speed. If only I-frames are used, e.g., P- and B-frames are avoided for trick play, the same data stream can be used for forward and backward direction if their respective data rates are the same. With identical data rates and speedup factors, the hold times and spatial resolutions will apply equally well to both forward and reverse trick play operation.

For example, the embodiment illustrated in FIG. 1B, uses three data storage devices 5A, 5B and 5C. The embodiment of FIG. 1B is capable of supporting 3, 9, and 27× forward and reverse speeds of operation wherein the 3× storage device 5A is used to support forward or reverse 3× trick playback operation, the 9× storage device 5B is used to support forward or reverse 9× trick playback operation and the 27× storage device 5C is used to support forward or reverse 27× trick playback operation.

In the case of manufacturing pre-recorded tapes, there is the possibility that the trick play data selection circuit can be relatively complex and a full encode with P and B frames can be used to produce trick play frames with forward and reverse having separate data streams. However, in VTRs intended for home use, such complicated circuitry may be prohibitively expensive. In such a case, a relatively simple trick play data extraction circuit may be desirable. A data extraction circuit such as the one illustrated in FIG. 1A, which generates a single reduced rate data stream from which trick play I-frames are chosen for multiple playback speeds supported by the VTR, is well suited for such consumer applications In determining the maximum size of the data storage devices 5A, 5B, SC, the size of each storage device 5A, 5B, 5C should be selected to be large enough to store the largest allowed reduced rate I-frame for the corresponding speed of trick play operation being supported by the storage device 5A, 5B, 5C.

A reasonable value for the data storage device sizes should be based on the expected maximum GOP size and the largest fast scan track data rate that a VTR incorporating the trick play data extraction circuit 1 is expected to support. If the input bitstream exceeds this expected maximum GOP size, the fast scan track frame will merely be of a lower resolution than is allowed by the fast scan data rate thus resulting in a minor quality penalty.

For each of the independent reduced rate data streams, e.g., 3×, 9× and 27× in the embodiment of FIG. 1B, to avoid overwriting data that is being read out of the storage devices 5A, 5B and 5C by the video frame selection circuit 17, two sets of data storage devices 5A, 5B, 5C may be used with a pair of storage devices being associated with each of the independent reduced rate data streams. In such an embodiment, the storage devices of each pair are used in a ping-pong manner with data being written to one of the storage devices while data is being read out of the other one of the storage devices. Thus, in such an embodiment, for a given speedup, one of the buffers will be written to as an I-frame arrives, while the other buffer may be read from, e.g., while the trick play I-frame is being recorded on the tape.

Various embodiments of data reduction circuits suitable for use as the data reduction circuits 7, 3A, 3B, 3C of FIGS. 1A and 1B will now be described with reference to FIGS. 2A, 2B and 2C.

One of the easiest approaches to extracting data from a normal play, e.g., full rate bitstream to produce a reduced rate bitstream suitable for recording in trick play tape segments to provide sufficient data for the generation of recognizable images or portions of images during VTR trick playback operation, is to use data prioritizing.

Referring now to FIG. 2A, there is illustrated a data reduction circuit 25 which uses data prioritizing to produce a reduced rate bitstream. As illustrated the data reduction circuit 25 includes a variable length decoder 27 which receives the parsed I-frames output by the intra-coded data identification and selection circuit 13. The variable length decoder performs a full decode on the video data it receives and supplies the decoded video data to the input of a trick play data prioritizer 29 which prioritizes the video data in accordance with a preselected data prioritization scheme. The prioritizer prioritizes the decoded video data, including DCT coefficients, sequence, picture, and slice headers as well as macroblock level data such as macroblock address information, macroblock type information, etc., as a function of its utility for generating images during VTR trick playback operation. The trick play data prioritizer 29 supplies the prioritized video data to the a trick play data selection circuit 31 which is coupled to the prioritizer 29. The data selection circuit 31 receives the prioritized data and selects a subset of the data for recording in trick play tape segments as a function of the priority assigned to the received video data by the trick play data prioritizer 29. The selected video data is then re-encoded by a variable length encoder 33 that is coupled to the output of the trick play data selection circuit 31.

In accordance with one embodiment of the present invention, a subset of video data is selected for trick play operation which retains all of the sequence, picture, slice and macroblock header information, the EOB code, the DC DCT coefficients and as many other non-DC DCT coefficients that can be recorded in the trick play tape segments being used by a VTR incorporating the data reduction circuit 25.

For a more detailed discussion of various prioritization schemes suitable for use in trick play operation see U.S. patent application Ser. No. 08/228,949.

In accordance with the embodiment illustrated in FIG. 2A, the number of amplitude/runlength pairs are retained from each block throughout each reduced resolution frame generated by the described data prioritization, selection and re-encoding process. This is achieved, by selecting an approximate break point which determines the number of DCT coefficients included in the video frame generated by the variable length encoder circuit 33, which is based on an estimate of how often I-frames are expected to be received, the hold time for the trick play speed being supported, and the speedup. The estimated breakpoint is then adjusted by the VTR during actual operation to provide an actual breakpoint based on how full output buffers (not shown) of the variable length encoder circuit 33 are during operation of the data reduction circuit 25. Well known algorithms such as those used to control breakpoints as a function of buffer fullness in MPEG encoders can be used to perform this breakpoint adjustment function.

It should be noted that because data constraints may vary for different trick play speeds of operation, when multiple data reduction circuits 3A, 3B, 3C are being used, each for a different trick play speed of operation, the breakpoint for each of the data reduction circuits 3A, 3B, 3C may also be different.

The AC DCT coefficients in MPEG-2 are sent as amplitude/runlength pairs corresponding to individual macroblocks. In accordance with MPEG-2, the two dimensional 8×8 block of pixels which corresponds to each macroblock is first mapped, via either MPEG-2's zig-zag scan technique or by its alternate scan technique, into a one dimensional length list consisting of 64 elements. In accordance with the encoding technique used, only the non-zero coefficients for each macroblock are coded, together with the number of zeros that preceded the non-zero coefficient.

In accordance with one embodiment of the present invention, a trick play breakpoint is chosen for the encoding of each macroblock based on counting the number of amplitude/runlength pairs, i.e., the number of non-zero AC coefficients, to be included in the macroblock being encoded and thus the reduced resolution I-frame being generated which comprises a plurality of such macroblocks. For example, in accordance with one embodiment of the present invention, the breakpoint is selected to be the 3rd non-zero AC coefficient.

In an alternative embodiment, the breakpoint used to control the variable length encoder 33, when encoding a macroblock, is based not on the number of non-zero coefficients but rather on the position of the non-zero coefficients, in zig-zag scan order. In accordance with one such embodiment, the breakpoint is determined to be the 10th frequency position within a macroblock.

In yet another embodiment, both the number of amplitude/runlength pairs and the position of the non-zero coefficient, in zig-zag scan order, for a macroblock being encoded, is used to determine the breakpoint for controlling the variable length encoder 33. For example, in one embodiment, the breakpoint is selected to be the 3rd non-zero coefficient or the 10th frequency position, whichever comes first.

Basing the breakpoint on the frequency position has the advantage of maintaining the spatial resolution from macroblock to macroblock insuring that each I-frame will be comprised of macroblocks of roughly the same resolution. However, selecting the breakpoint in this manner may mask an important feature, such as edge or texture, that would be useful in maintaining intelligibility of the image in trick play.

It should be noted that regardless of whether the encoding breakpoint is expressed in terms of the number of amplitude/runlength pairs included in each macroblock or the position of the non-zero coefficient, in zig-zag scan order, the breakpoint for a given VTR should be selected as a function of the amount of trick play space that the particular VTR is designed to provide for trick play data. This preselected breakpoint can then be programmed into the variable length encoder 33 and used as the breakpoint during the encoding process.

Referring now to FIG. 2B, there is illustrated another data reduction circuit 35 according to the present invention which may serve as any one of the data reduction circuits 7, 3A, 3B, 3C of FIGS. 1A and 1B.

The data reduction circuit 35 comprises a variable length decoder circuit 27, an inverse quantizer circuit 37, a quantizer circuit 39 and a variable length encoder circuit 33. The variable length decoder 27 receives as its input a parsed digital video bitstream representing video frames, upon which it performs a full variable length decode operation. The decoded video data is then supplied to the input of the inverse quantizer circuit 37 which inverse quantizes the non-DC (AC) DCT coefficients included in the decoded data. The inverse quantized AC DCT coefficients are then re-quantized by the quantizer circuit 37 using larger quantization step sizes then used at the time the data was originally encoded to decrease the amount of data used to represent the video frame being processed. Different quantization scale factors may be used for each trick play speed of operation supported depending on data constraints. The requantized AC coefficients along with the DC DCT coefficients and other video data included in the bitstream are then variable length encoded by the variable length encoder circuit 33 to produce the reduced resolution video frames intended to be recorded in trick play tape segments to support video tape recorder trick play operation. The reduced resolution video frames generated by the variable length encoder circuit 33 are output by the data reduction circuit 35 to, e.g., the storage device 15 of FIG. 1.

While the re-quantization of video data, e.g., the DCT coefficients, in the above described manner, is more complicated than the previously described data reduction approaches because of the need to inverse quantize and then re-quantize the data, this approach is likely to yield better looking reduced resolution frames for trick play use then are the other methods of generating reduced resolution frames form received normal play video frames. This is especially true at relatively high trick play data rates where many of the AC DCT coefficients in the received bitstream are going to be retained anyway using, e.g., the prioritization and selection method of data reduction. However, it should be noted that if space is limited in the trick play tape segments to the DC DCT coefficients only then there is no advantage in requantizing.

Figures 2C, 3:
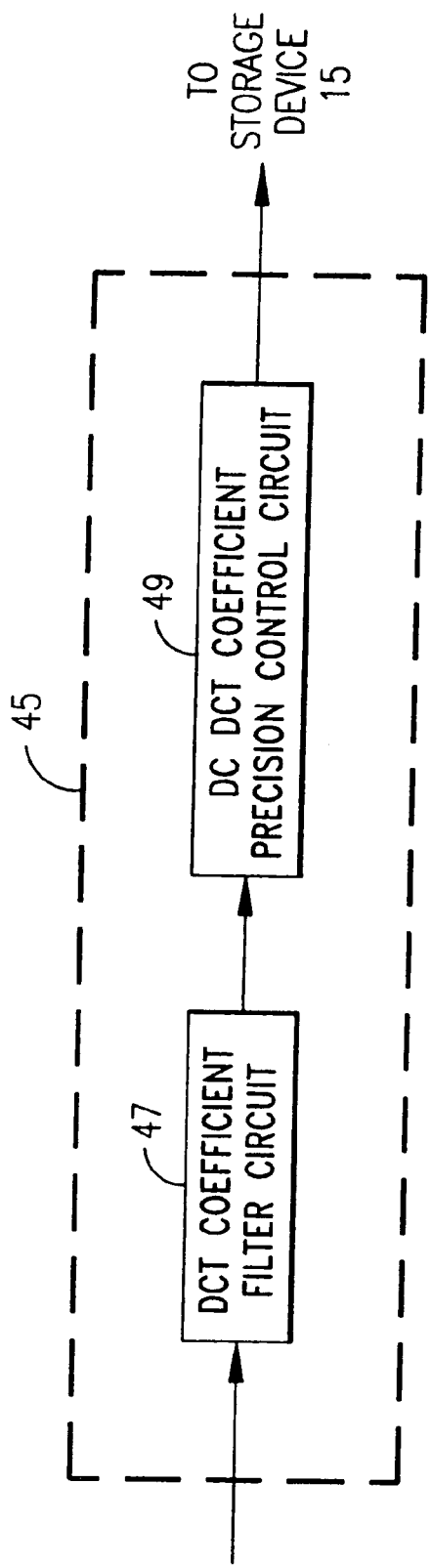

When there is only enough space in the trick play tape segments for recording the DC DCT coefficients of each I-frame, the data reduction circuit illustrated in FIG. 2C, is particularly well suited for generating the reduced resolution I-frame for recording in the trick play tape segments. As illustrated the data reduction circuit 45 includes a DCT coefficient filter circuit 47 for identifying and removing the AC DCT coefficients included in the video data supplied to the data reduction circuit 45. Coupled to the output of the DCT coefficient filter circuit 47 is a DC DCT coefficient precision control circuit for detecting the number of bits used to represent the DC DCT coefficients and for reducing the number of bits used to represent a DC DCT coefficient to 8 bits when it detects that the DC DCT coefficient has been represented by 9 or 10 bits of precision. The video data output by the DC DCT coefficient precision control circuit is video data which represents low resolution I-frames which do not include any AC coefficients. Because of the simplicity of the data reduction circuit 45, it offers a relatively inexpensive way of reducing the data used to represent I-frames. Accordingly, the data reduction circuit 45 is particularly well suited for use in consumer VTRs where cost and circuit complexity is an important concern.

Another enhancement, in accordance with the present invention, to the data reduction methods implemented by is the data reduction circuits 25 and 35 of FIGS. 2A and 2B is based on the tendency of humans not to notice decreases in image resolution towards the edges of a frame as much as towards the center of a frame. In accordance with one embodiment of the present invention, macroblocks corresponding to the center of a frame are allocated more data so that they will be of a higher resolution than macroblocks corresponding to positions located towards the edges of a video frame. In accordance with such an embodiment, the breakpoint for the encoder 33, of data reduction circuits 2A and/or 2B for macroblocks corresponding to the edges of a video frame, is selected to be higher than the breakpoint for macroblocks corresponding to the center portion of a video frame so that the macroblocks corresponding to the center portion of the video frame will be of a higher resolution than macroblocks corresponding to the edges of the video frame being encoded.

While the various data reduction circuits 25, 35, 45, have been described as being used in conjunction with the trick play data extraction circuits of FIGS. 1A and 1B it is to be understood that they may be incorporated into a wide variety of VTR circuits where the production of low resolution frames from data representing higher resolution video frames is required.

In addition, it should be noted that because the trick play data extraction circuits described herein contain many circuit elements which are also used in the data extraction circuits described patent application Ser. No. 08/298,015 for "METHOD AND APPARATUS FOR THE SELECTION OF DATA FOR USE IN VTR TRICK PLAYBACK OPERATION IN A SYSTEM USING PROGRESSIVE PICTURE REFRESH", filed on even date herewith and expressly incorporated by reference, the trick play data extraction circuits described in both this and the referenced application may be readily combined to provide a single trick play data extraction circuit capable of generating reduced resolution fully intra-coded video frames for trick play use from a video data stream that includes intra-coded video frames for display refresh or relies on progressive refresh techniques and therefore lacks I-frames on a regular basis.

What is claimed is:

1. A data reduction method, for reducing the amount of data used to represent an image, the method comprising the steps of:

receiving a first set of encoded data representing the image;

decoding the first set of data to generated a decoded set of data representing the image; and encoding the decoded set of data representing the image to produce a second set of encoded data including a plurality of macroblocks, the second set of encoded data being smaller than the first set of encoded data, the encoding step including the steps of:

performing a variable length encoding operation to generate for each macroblock a plurality of amplitude/runlength pairs; and limiting, as part of the variable length encoding operation, the number of amplitude/runlength pairs included in each macroblock to thereby reduce the amount of data used to represent each macroblock to an amount that will result in the second set of encoded data being smaller than the first set.

2. The method of claim 1, wherein the step of limiting the number of amplitude/runlength pairs includes the step of controlling a breakpoint used by a variable length encoder when performing the variable length encoding operation.

3. The method of claim 1, wherein the encoding step further includes the steps of:

generating, for each macroblock, a first set of DCT coefficients; and selecting, to represent the macroblock, from the first set of DCT coefficients, a second set which is smaller than the first set.

4. The method of claim 3, wherein the decoding operation includes the step of performing a variable length decoding operation.

5. The method of claim 4, further comprising the step of:

performing an inverse quantization operation on the decoded set of data; and performing a quantization operation on the inverse quantized set of decoded data prior to performing the encoding step.

6. The method of claim 1, wherein the first set of encoded video data is MPEG-2 compliant video data.

7. A data reduction device, for reducing the amount of data used to represent an image, the device comprising:

a decoder for decoding a first set of encoded data representing the image to thereby generate a decoded set of data representing the image; and means for performing a variable length encoding operation on the decoded set of data to produce a second set of encoded data including a plurality of macroblocks, at least some of the plurality of macroblocks including a plurality of amplitude/runlength pairs; and limiting, as part of the variable length encoding operation, the number of amplitude/runlength pairs included in each macroblock to thereby reduce the amount of data used to represent each macroblock to an amount that will result in the second set of encoded data being smaller than the first set of encoded data.

8. The device of claim 7, wherein the means for encoding is a variable length encoder; and wherein the number of amplitude/runlength pairs included in a macroblock is limited by controlling a breakpoint used by said variable length encoder.

9. The device of claim 8, further comprising:

an inverse quantizater coupled to the variable decoder for performing an inverse quantization operation on the decoded set of data; and a re-quantizer coupled to the inverse quantizer and the encoding means, for requantizing inverse quantized data generated by the inverse quantizer prior to encoding by said encoding means.

10. The device of claim 7, further comprising:

an inverse quantizater coupled to the variable decoder for performing an inverse quantization operation on the decoded set of data; and a re-quantizer coupled to the inverse quantizer and the encoding means, for requantizing inverse quantized data generated by the inverse quantizer prior to encoding by said encoding means.

11. The device of claim 7, wherein the first set of encoded data is MPEG-2 compliant video data.

* * * * *